United States Patent [19]

Davis

[11] Patent Number: 5,012,683
[45] Date of Patent: May 7, 1991

[54] CAPACITIVE LIQUID INTERFACE SENSOR

[75] Inventor: James E. Davis, Wilmington, Del.

[73] Assignee: E. I. DuPont de Nemours and Company, Wilmington, Del.

[21] Appl. No.: 466,938

[22] Filed: Jan. 18, 1990

[51] Int. Cl.⁵ .................................................. B01L 3/02
[52] U.S. Cl. .................................. 73/864.24; 73/290 R
[58] Field of Search ........... 73/863.01, 864.23, 864.24, 73/864.25, 304 C, 290 R; 361/284; 422/63, 67, 100; 324/672, 674, 679, 681, 683

[56] References Cited

U.S. PATENT DOCUMENTS

| | | |
|---|---|---|
| 3,391,547 | 7/1968 | Kingston . |
| 3,635,094 | 1/1972 | Oberli ............................... 73/863.01 |
| 3,939,360 | 2/1976 | Jackson ................................ 361/278 |
| 4,099,167 | 7/1978 | Pomerantz et al. ............... 73/304 C |
| 4,326,851 | 4/1982 | Bello et al. .............................. 422/64 |
| 4,635,478 | 1/1987 | Hope ...................................... 73/292 |
| 4,736,638 | 4/1988 | Okawa et al. ..................... 73/864.24 |
| 4,818,492 | 4/1989 | Shimuzu ............................. 422/100 |
| 4,829,837 | 5/1989 | Telfer ................................. 73/304 C |
| 4,873,875 | 10/1989 | Cork ................................. 73/864.23 |

FOREIGN PATENT DOCUMENTS

| | | | |
|---|---|---|---|
| 0039184 | 4/1978 | Japan ................................ 73/863.01 |
| 0039185 | 4/1978 | Japan ................................ 73/863.01 |
| 0108754 | 6/1985 | Japan ................................ 73/863.01 |
| 2066961 | 7/1981 | United Kingdom ............. 73/304 C |

*Primary Examiner*—Robert Raevis

[57] ABSTRACT

A capacitive sensor is described having an element which traverses the outside of a container of liquid to ascertain the vertical locations of liquid interfaces in the container. The sensor uses an oscillator whose amplitude or phase is a function of the capacitance of the element.

9 Claims, 4 Drawing Sheets

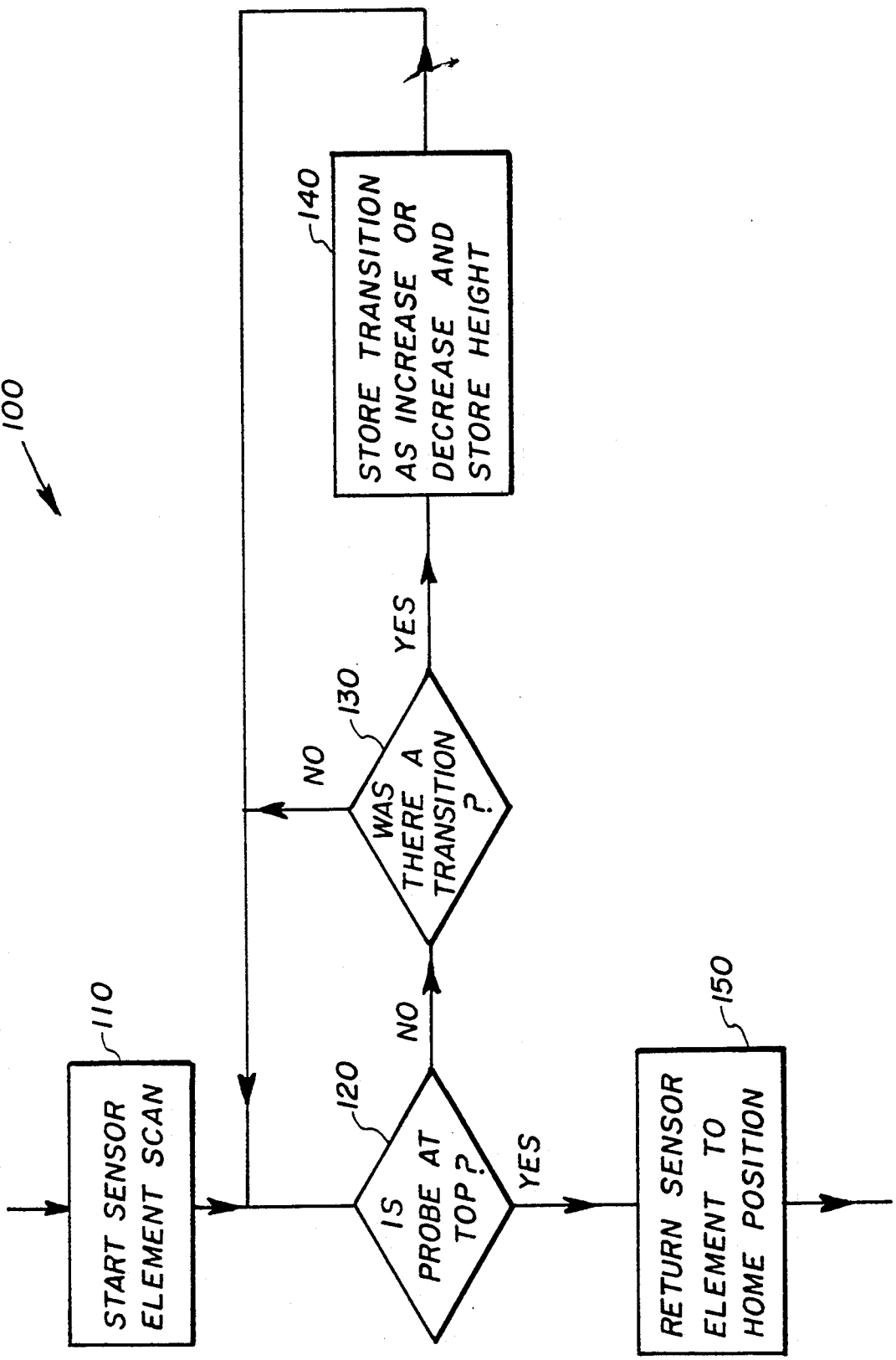

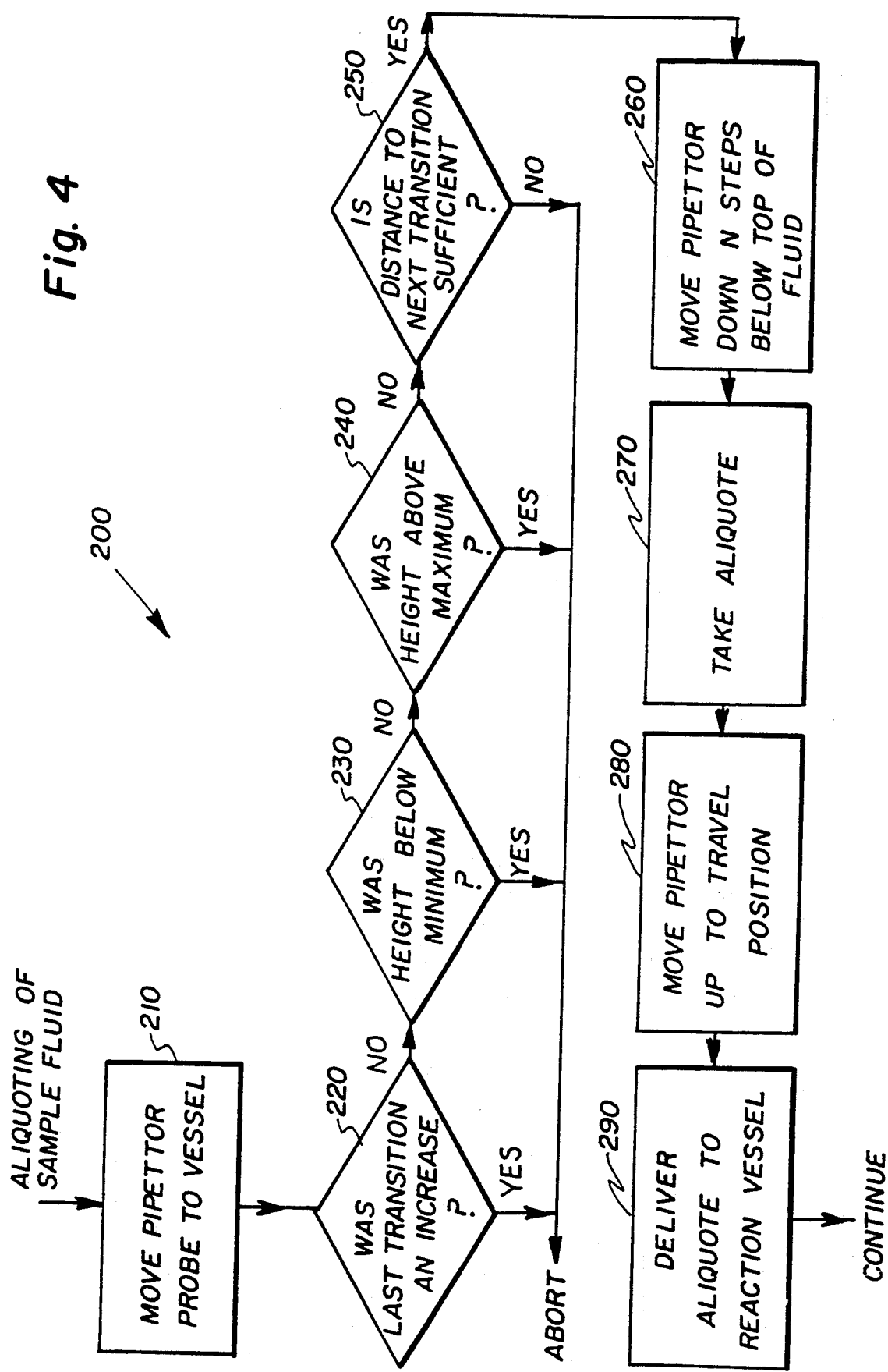

CAPACITIVE LIQUID INTERFACE SENSOR

CROSS-REFERENCE TO RELATED APPLICATIONS

This application contains subject matter described in copending applications for Capacitive Liquid Level Sensor, Ser. No. 07/466,937 filed Jan. 18, 1990 and for Capacitive Liquid Level Sensor, Ser. No. 07/466,936, filed Jan. 18, 1990.

BACKGROUND OF THE INVENTION

This invention relates to capacitive liquid level sensors and, more particularly, to capacitive sensors capable of sensing the interface between different layers, including air. Such liquid level sensors find use in many instruments wherein a robotic probe is used to withdraw liquid from a container containing a sample to be analyzed or a reagent.

In such robotic systems, it is desirable to have knowledge of the level of the liquid or the interface between liquids in the container such that the probe used to withdraw the liquid can be controlled (1) to withdraw a particular layer of liquid in the container or (2) to minimize contact with an undesired portion or layer of the liquids in the container. In such systems one is dealing with generally immiscible liquids such as occurs in the collection of blood. In a typical blood system producing packed red blood cells the red blood cells will be in the lower portion of the container. Immediately above the packed cells is a commercial separation gel. Above the separation gel is the serum or plasma and finally air on the top. Contamination of the sampling probe by the separation gels is very undesirable. Often it is relatively difficult to remove the gel from the probe and can in fact cause clogging of the probe and missampling to occur. Therefore it is highly desirable to provide some system of locating the gel-serum interface so that the serum only can be withdrawn and the probe prevented from contacting the gel.

To accomplish this objective, it is necessary to be able to sense the level of the liquid interfaces at all times on a real time basis. Various level sensors have been developed for this purpose. Among those are the so-called capacitive level sensors. These are based on the fact that any conductor exhibits a finite electrical capacitance. This capacitance, when approaching a liquid having a higher dielectric constant, will increase. When the sensing probe is in close proximity to a liquid, the higher dielectric constant and greater surface area results in an increased capacitance of the probe. These capacitance changes caused by the liquid can be rather small so that sensitive detection devices are required.

Devices known in the prior art that are suitable for detecting small changes in capacitance include bridges, RC or LC oscillators and frequency meter counters (including heterodyning), phase locked loops, zero crossing periodometers, amplitude changes to an RC or LC filter, and phase shift changes through an RC or LC circuit.

Among the prior art capacitive liquid level sensors are Kingston U.S. Pat. No. 3,391,547 which discloses a capacitive liquid level probe for a liquid tank. He utilizes a capacitor probe, disposed in the liquid, as one leg of a bridge circuit. An unbalance in the circuit, as a result of change in capacitance of the probe, is detected by a phase sensitive detector which is referenced by the fixed frequency excitation oscillator through a variable phase shifter. The variable phase shifter allows for offset adjustment.

In similar manner, Oberli U.S. Pat. No. 3,635,094, discloses a capacitive level sense means for an automatic transfer pipette. The sample probe is utilized as the first element and a metal stand around the sample vessel is the second element which forms a capacitor in one leg of a bridge circuit. The remaining legs of the bridge consist of a variable capacitor leg and two resistor legs. The variable capacitor leg may be adjusted such that its capacitance matches that of the probe contacting the liquid. The bridge circuit is excited by a fixed frequency oscillator and a differential amplifier is utilized to determine when the bridge is balanced indicating that the probe has contacted the liquid.

Bello et al. U.S. Pat. No. 4,326,851 discloses a level sense apparatus and method for use in an automatic clinical analyzer in which a variable capacitor is formed by a grounded probe and a metal plate, which is connected to the detection circuit, disposed below the sample vessel. A fixed frequency excitation signal is utilized and the capacitance change resulting from the probe contacting the liquid is detected as a voltage change in the detection circuit. This arrangement presents a problem in that spills on the electrode or supply tray can change the circuit operation and the circuit requires the use of shielding pads.

Another U.S. patent, Okawa et al. U.S. Pat. No. 4,736,638 discloses a liquid level sense apparatus for use in an automatic clinical analyzer. A metal plate disposed under the sample vessel and connected to a fixed frequency oscillator emits low frequency electromagnetic radiation up through the sample. The dispense probe serves as an antenna and is connected to a detection circuit, having appropriate bandpass filtering, which detects a voltage amplitude change when the probe contacts the liquid sample. This circuit has many of the disadvantages of Bello. In addition, the use of low frequency limits the time response of the circuit.

Finally, Shimizu U.S. Pat. No. 4,818,492 discloses a capacitive liquid level sensor for an automatic clinical analyzer. He utilizes a resistor bridge with a fixed frequency oscillator exciting one diagonal of the bridge and the probe serving as a capacitor across the other diagonal. Phase shift across the capacitor (probe), as a result of change in capacitance of the probe, is detected by a phase detector which is referenced by the fixed frequency excitation oscillator through a variable phase shifter. The variable phase shifter allows for offset adjustment. The output of the phase detector is filtered and compared against a reference value to provide a signal indicating the presence of liquid at the probe.

None of these sensors are directed to sensing the liquid interfaces in any useful fashion as the probe must disturb such interfaces as it journeys down through the tube or container. To solve this problem, various systems have been devised which seek to determine liquid level from the exterior, of a container. Typical of these systems are those described in U.S. Pat. No. 4,099,167 and U.S. Pat. No. 4,002,996. In both of these systems electrodes are disposed on the exterior of the container and changes in the dielectric provided by the contained liquid as compared to air is sensed by causing a variation in a capacitance sensitive detector. Another system such as that described in U.S. Pat. No. 4,371,790 uses the electrical conductance of a liquid to determine the level of the liquid contained in a container.

Finally, U.S. Pat. No. 3,939,360 describes a similar system in which a tape is attached or fixed to the outside of a container whose liquid level is to be sensed. Unfortunately such system, as are the others of the prior art, is relatively inaccurate in sensing the location of the liquid interfaces and are unable to seek the level of liquid/air interface but must allow the interface to pass by its location before such is detected.

Optical sensors can be used, but they often are impractical for the simple reason that paper or other labels are usually affixed to the outside of the container and hence would prevent optical scanning. Furthermore, if the outside of the container is dirty as for example with dried blood, the optical ability to sense could be considerably decreased. Also any water that may condense on the exterior surface would interfere with optical sensing. This would be a particular problem when the sample has been refrigerated.

SUMMARY OF THE INVENTION

Many of these problems inherent in the prior art sensors inability to reliably sense the location of liquid interfaces are reduced with the use of the subject invention. This invention provides a means to estimate the position of multiple interfaces so that the movement of the probe can be restricted and prevented from entering undesired regions and/or directed to the precise location desired between layers of liquid.

In accordance with the preferred embodiment of this invention a capacitive sensor is used for determining the level of an interface between two liquids each having a different dielectric value, the liquids being held in a container having a generally vertical axis, the sensor comprising: an electrically conductive element, first drive means for translating the element along the outer surface of the container generally parallel to the axis, an oscillator coupled to the element for applying a high frequency signal to the element, the amplitude and/or phase of the oscillator being affected by the capacitance of the element, and comparator means for generating a level sense signal according to the amplitude or phase of the oscillator for signalling the element having reached a liquid interface, whereby such signal denotes the region along the container axis where there is a liquid interface.

The sensor may be an adjunct to a probe for withdrawing liquid from the container which has a second drive means for introducing the probe into the container and withdrawing liquid therefrom, the second drive means being responsive to the interface sense signal for directing and limiting the probe movement with respect to the interface. When a sensor of this type is used with an element that mechanically scans a blood collection tube from the outer surface of the tube, as the element encounters the base of the tube (end opposite the stopper) the capacitance increases because of the proximity of the packed red cells which medium is of high dielectric and conductive. Next the element encounters a separation gel which medium is of low dielectric and not conductive. For purposes of this invention, the gel is considered to be a liquid. The "gel" may be beads or other structures used for separating fluids of a different density.

Next the element encounters serum or plasma which medium is of high dielectric and conductive. Finally the element encounters a zone of air which medium is of low dielectric and not conductive. Thus the capacitance of the sensing element increases to some relatively high value through the red cell zone then abruptly decreases at the gel interface, then abruptly increases at the serum interface and finally abruptly decreases at the air interface. These abrupt changes are discriminated and correlated to the mechanical position of the sensing element.

The sensor has the advantage of being independent of the optical characteristics of the sample container. Sensing also can be achieved through a paper label such as a bar code identification label. Neither dried blood nor water condensation presents a problem.

According to the method of this invention the position of an interface between two liquids each having different dielectric values, where the liquids are held in a container having a vertical axis, includes the steps of: applying a high frequency signal to an electrically conductive element from a signal source, translating the element proximate the outer surface of the container generally parallel to the axis, detecting the phase difference between the signal from the source and that from the element, whereby a change in the phase difference denotes a liquid interface along the container axis.

In a preferred embodiment, the method also uses a probe for withdrawing liquid from the container and includes the additional steps of introducing the probe into the container and withdrawing liquid therefrom and limiting the probe movement in accordance with the sensor signal to prevent the probe from penetrating undesired interfaces yet selecting the portion from which the liquid is drawn.

BRIEF DESCRIPTION OF THE DRAWINGS

A more complete understanding of the invention and its advantages may be understood in connection with the accompanying drawings in which:

FIG. 3 is a flow chart depicting the manner in which the CPU controls the sensor of FIG. 1 to determine the nature and position of liquid interfaces; and FIG. 4 is a flow chart depicting the manner in which the CPU controls the sensor of FIG. 1 to aliquot samples.

DESCRIPTION OF THE PREFERRED EMBODIMENT

Figure 1:
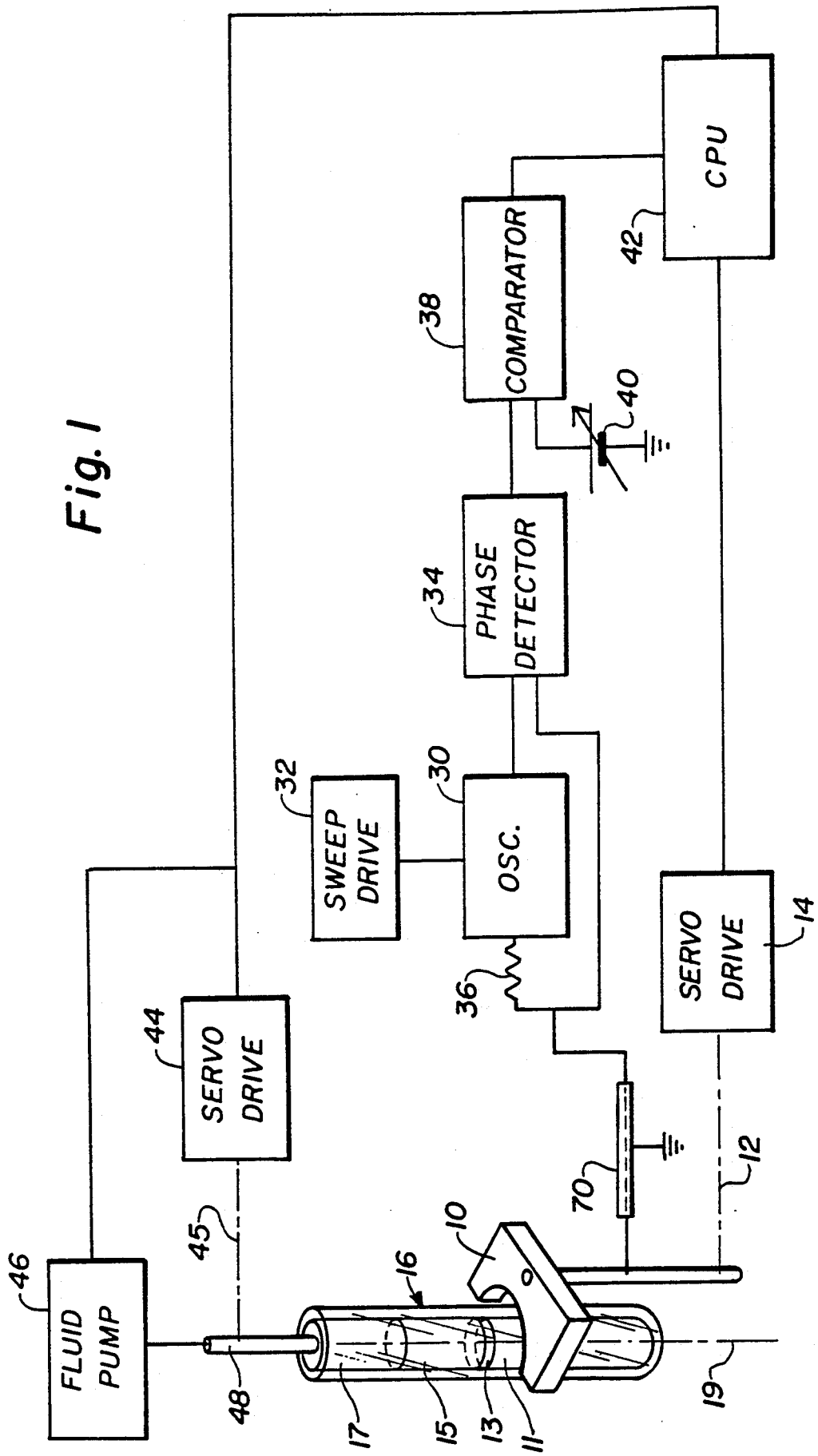
FIG. 1 is a block diagram of a liquid interface sensor constructed in accordance with this invention.

Reference is now made to the drawings in which FIG. 1 illustrates a position sensing element 10 driven by a robotic arm 12 which is controlled by a servo drive 14 of conventional design. The element 10, translated in the X, Y, and Z directions by the servo drive 14 of conventional design, is adapted to be positioned adjacent any one of plural sample, reagent or reaction containers 16 (only one of which is shown).

Each sample or reagent containers 16 has an axis 19 and will be described in connection with a typical use of this invention which is the use in connection with a blood collection tube. In such a blood collection tube, the container 16 could have packed red cells in the lower portion 11 separated by a gel 13; a serum 15 would be above the gel layer 13 and finally air 17 would be on the top. The sensing element 10 is adapted to traverse the exterior portion of the container 16 in a direction generally parallel to the axis 19, i.e., the Z direction. The element 10 is a flat metallic plate preferably of some relatively inert material such as stainless steel or platinum and is shaped to partially conform to the exterior curvature of the container 16. The element 10 is relatively thin; typically ⅛ of an inch. The packed red cells constitute a relatively high dielectric and conductance. On the other hand the separation gel 13 is a medium of low dielectric and is not conductive. The serum medium 15 has a high dielectric and conductance. The air zone however 17 is of low dielectric and low conductance.

This invention deals with a method and sensor capable of distinguishing these changes in capacitance caused by the different dielectrics and hence the location of the interfaces between the several layers of liquids in the container 16.

A pipettor 48 for removing liquids from the container 16 is coupled through a flexible coupling such as a plastic tube to a fluid pump 46. The pipette is operated by a linkage 45 which in turn is positioned by a servo drive 44 which raises and lowers the pipette 48. The servo drive 44 and the fluid pump 46 are both actuated in turn by the CPU 42 using any known conventional system for this purpose. One such system is that known as the DimenSion ™ Analyzer sOld by E. I. du Pont de Nemours and Company, Wilmington, Del.

An oscillator 30 is coupled to an electrically conductive element 10 through an isolating resistor 36 and coaxial cable 70 whose sheath is grounded. In turn the oscillator 30, which may be a voltage controlled oscillator (VCO), is connected to be swept in voltage by a sweep drive 32 which preferably provides a linear (e.g., triangular or sawtooth) waveform such that the oscillator is successively swept through a range of frequencies. Abrupt changes in the probe capacitance, which occur when the probe contacts a liquid, generate a spectrum of frequencies in the output of the detector. The sweep oscillator preferably sweeps the high frequency oscillator frequency at a repetition frequency above those frequency components generated by abrupt changes in probe capacitance.

The output of the oscillator is coupled to a phase detector 34 preferably capable of providing a D.C. output voltage. In this manner the phase detector is subjected to the shift in phase or amplitude caused by a change in the dielectric to which the element is subjected. There is a stray capacitance between the probe element and liquid in the container 16. When the element encounters a liquid of higher or lower dielectric constant, an interface is recognized and the output of the phase detector is a D.C. signal which varies in phase or amplitude in accordance with the changing capacitance sensed by the element.

A comparator 38 compares the signal from the phase detector 34 with a reference obtained by an adjustable voltage source 40. The output of the comparator is applied to a central processing unit (CPU) 42 which in turn is programmed to control the servo drive 14 in any conventional manner such as that described in U.S. Pat. No. 4,818,492. It controls the pipettor 48 to suck liquid from the container 16 at a height Z that was identified by the sensor. Thus the central processing unit 42 controls both the position of the pipettor 48 and whether the pipettor sucks up fluid from a container in accordance with the position sensed by element 10. Such central processing units are well known and will not be described further since they do not relate to the particular invention which is a liquid interface sensor.

In operation the element 10 as moved axially along the outer external surface of container 16 which by way of illustration may contain blood separated into red cells 11, gel 13, and serum 15. As the element 10 encounters the base of the tube 11 containing the packed red cells the capacitance increases because of the proximity to packed red cells which medium is of high dielectric and is conductive. Next the element 10 encounters the separation gel 13 which medium is of low dielectric and is not conductive. Next the element encounters the serum 15 which medium is of high dielectric and is not conductive. Finally the sensing element 10 encounters the zone of air 17 which medium is of low dielectric and is not conductive.

Correspondingly, the capacitance increases to some relatively high value through the red cell zone, abruptly decreases at the gel interface 13, then abruptly increases at the serum interface 13–16 and finally abruptly decreases at the air interface 15–17. These abrupt changes are discriminated and correlated to the mechanical position of the sensing probe 10.

The CPU is programmed to cause the sensing element of this invention to scan a vessel and to store for subsequent use the height and nature (increase or decrease in capacitance) of the transitions. Later, when the vessel previously scanned is to be accessed, the CPU commands the pipettor probe to be positioned over the vessel. If the last transition of the scan was a decrease in capacitance, then the CPU compares the height recorded with the transition against acceptable highest and lowest heights and further that the distance between the top and next to top transition is sufficient to allow the pipettor probe tip to be slightly submerged without being too close to the gel-serum interface. Having passed the acceptance tests, the pipettor probe is lowered to a height such that its tip is just below the serum-air interface. The desired aliquot is taken and the pipettor probe raised to the height for travel. After the sample has been acquired, it is placed in a reaction vessel along with additional reagents to form a color whose absorbance is related to the analyte concentration in the sample.

While the preferred embodiment of the invention described uses a phase detector and RC phase shift circuit it is to be understood that any of the devices known in the prior art using a source of electrical oscillations for detecting small changes in capacitance may be used. In each case, the high frequency signal is affected in some manner by the sensing element's capacitance and the affection is detected whether it be bridge unbalance, amplitude change in an RC or LC filter, phase shift in an RC or LC circuit or whatever. The signal 76 affection depicts a change in amplitude and/or phase over that of waveform 64, the degree of change being a function of a sample dielectric.

This invention solves the problem of seek-time by finding the approximate top of the fluid so that the probe 48 need only level sense from a short distance above the liquid. In many cases, this external level sense is all that is required, i.e., no additional level sense on the probe 48 is needed. This invention also eliminates the problem of contacting an undesired layer such as a gel because by locating the position of the gel, the probe can be inhibited from traveling into the gel.

Generally the container is scanned from the bottom up so that the sensing element always begins in a known state (i.e. vs. air). The top may be inaccessible or cluttered with stoppers.

In ordinary circumstances for a blood collection tube, the last capacitance transition is a decrease, corresponding to the serum to air interface. The previous transition will have been an increase in capacitance, corresponding to the gel to serum interface, or the bottom of the tube (i.e. absence of gel). In the former there will be an additional transition corresponding to packed-cell to gel interface. In all events, the pipettor probe would be positioned with the tip approximately 1 mm under the surface of the serum, but if that would position it within 5 mm of the gel then the sample procedure is not attempted because of its liability to clog and otherwise contaminate the sampling probe. The gel is distinguished from the bottom of the vessel by the known position of the bottom which is fixed by the design of the instrument. In the event of non-attempt to sample, the operator is expected to transfer the serum to another vessel which has no gel.

In some circumstances the last capacitance transition may be an increase. This may occur if the vessel is completely full such that the sensor element is unable because of mechanical constraints to scan to or past the top of the vessel. In this case, the serum to air interface is given a default value, however the gel to serum interface (if present) is still valuable information needed to prevent pipettor probe travel into the gel.

If a substantial amount of serum is to be taken, the pipettor probe is programmed to descend into the vessel at a rate to match the computed fall in height as the serum is withdrawn. Again, the maximum travel of the pipettor probe must be restricted to avoid contamination by gel.

FLOW CHART

The invention may be better understood with reference to FIGS. 3 and 4 in which flow charts are depicted which describe to software used by the CPU to control the acquisition of the position of the interfaces (FIG. 3) and aliquoting the sample fluid (FIG. 4). In FIG. 3, the sensor element is commanded 110 to start scanning up from below the bottom of the vessel. The status of the sensor is polled in decision point 120. If the probe element is at the top of 35 travel, then control is passed to process 150 where the sensor element is moved to a home position below the vessel. Otherwise the status of the sensor is polled for the occurance of a transition. If there was no transition, control is passed back to decision point 120. Otherwise a transition has occurred and the nature (increase or decrease in capacitance) is stored and the height of the transition is stored. Control is then passed back to decision point 120.

Having acquired the interface position information, initially (block 210 of FIG. 4), the pipettor probe is moved to the vessel but with the probe still above the vessel. Decision point 220 checks that the last stored transition from the level sensor was a decrease corresponding to a serum to air interface. If not a decrease, then the process is aborted because of possible pipettor probe contamination or other malfunction if the process is continued. If a decrease, then control is passed to decision point 230 where the height of the last transition is compared to the lowest acceptable height. If the height is too low, the process is aborted. Otherwise control is passed to decision point 240 where the height of the last transition is compared to the highest acceptable height If the height is too high, the process is aborted. Otherwise control is passed to decision point 250 where the height of the serum is calculated and compared to a minimum acceptable below which probable contamination of the pipettor probe would occur.

If sufficient height of serum is present, control is passed to process 260 where the pipettor probe is lowered to a height that is computed such that only the tip of the pipettor probe is submerged into the serum so that the outside of the probe is minimally contaminated by the serum. When the pipettor probe has reached the computed height, control is passed to process 270 and the desired volume (aliquot) of fluid is withdrawn. Control is passed to (aliquot) of fluid is withdrawn. Control is passed to process 280 where the pipettor probe is raised to the travel height following which process 290 moves to pipettor probe to a position where the serum is delivered to a reaction vessel and the determination of the desired constituents of the serum can take place.

Figure 2:
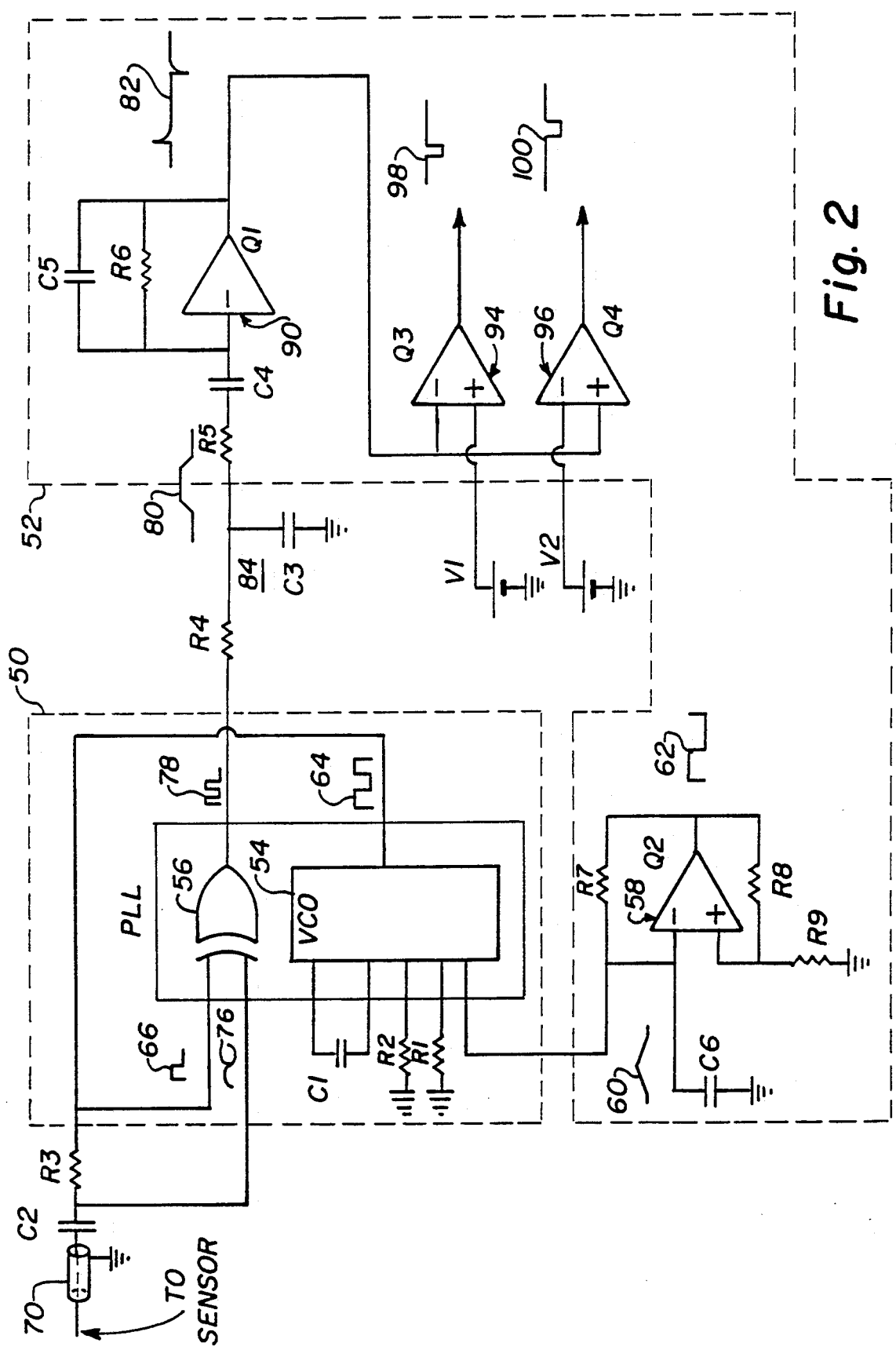
FIG. 2 is a schematic diagram of a preferred embodiment of the liquid interface sensor constructed in accordance with this invention.

With reference to FIG. 2, a specific circuit constructed in accordance with the preferred embodiment of this invention for sensing liquid levels is illustrated. In this circuit essentially two integrated circuit chips are used. The first is phase-locked loop which may use, for example, a CD4046BM chip made by National Semiconductor. In addition a quad operational amplifier chip made by Texas Instrument Company, TLC274CN may be used. The phase-lock loop is designated by the dashed block 50. Similarly, the quad operational amplifier is designated by the dashed block 52. The phase-lock loop includes a voltage control oscillator 54 and several phase comparators only one of which, 56, is shown. The voltage controlled oscillator 54 has several inputs which have been selected to provide a nominal 1 MHz by choice of resistors R1 and R2 and capacitor C1. The selection of these values is described in the application notes for the chip from National Semiconductor. The VCO 54 is caused to sweep by a sweep oscillator in the form of an a stable oscillator which is constructed as part of the quad operational amplifier chip 52. The sweep oscillator, designated 58, is constructed such that the output is applied through resistor R7 and capacitor C6 to the inverting input of the amplifier labelled Q2. Further, the output of Q2 is applied through resistors R8 and R9 to the noninverting input of the amplifier. Suppose that the output of the amplifier goes high. The voltage at the noninverting input will go high. The voltage at the noninverting input will remain low because of capacitor C6. As charge accumulates on capacitor C6 a time will come when its voltage exceeds that of the noninverting input at which time the output of Q2 will swing low. In a similar fashion resistors R8 and R9 apply a low voltage to the noninverting input of Q2. Because of capacitor C6 the voltage at the inverting input will remain high.

This status will remain until the voltage across C6 is discharged to a voltage below that of the noninverting input at which time the output of Q2 will swing high and the cycle will repeat endlessly. In this circuit it is customary to take the voltage from the output which is a square wave 62. However to obtain a voltage sweep to provide a linear sweep of frequency of the oscillator, a sawtooth or triangular waveform is preferred. This is the signal found at the junction of R7 and C6. This approximately triangle wave 60 is applied to the VCO input. This signal causes the voltage controlled oscillator to sweep approximately 20 kHz around the nominal 1 MHz frequency. The rate at which it sweeps up and down is approximately 20 kHz and is determined by the values of the resistors $R_7$, $R_8$, and $R_9$.

The output of the voltage controlled oscillator 54 is designated by the square waveform 64. The output of the VCO is applied to two portions. One portion is supplied to a phase comparator 56. This serves as the reference signal and is illustrated by the waveform 66. The other portion of the output of the VCO is supplied to an RC phase shifter composed of elements R3, C2 and the sensing element. Capacitor C2 is used as the D.C. blocking capacitor. The actual capacitance affecting the phase shift is composed of the capacitance of the coaxial cable labelled 70 and the capacitances to ground of the sensing element 10. The element is metal as described. The junction between R3 and C2 is a signal labelled 76 and the signal from the element that is affected by the dielectric of the sample. This signal 6 is an approximate triangle wave and is applied to the signal input of phase comparator 56.

Phase comparator 56 is of the exclusive OR variety. The output of the phase comparator is a series of pulses, the width of which depends on the phase difference between the reference signal 66 and the input signal 76. The output of the phase comparator 56, in the form of the square wave 78, is applied to an RC filter network 84 composed of resistor R4 and C3. The purpose of this filter is to remove the pulses from the phase comparator and produce an approximate D.C. level proportionate to the area of the waveform 78. If the pulse width of 78 changes then the approximate D.C. level of the filter 84 will change. The changing D.C. level is represented by the waveform 80 which is applied to a differentiator 90, the heart of which is an operational amplifier Q1, a member of the quad operational amplifier 52. Thus, to effect the differentiation, the output of the RC filter 84 is applied through resistor R5 and capacitor C4 to the input of the amplifier 90. The feedback portion of the amplifier 90 is composed of R6 and C5 in parallel. These components have been selected to form a differentiator for low frequencies, namely the changing portion of waveform 80. These components also filter out high frequency noise that might leak through the filter network 84.

The output of the differentiator 90 is in the form of pulses, the height of which is dependent on the rate of change and extent of change of waveform 80. This output signal is represented by the waveform 82. These pulses can then be discriminated with a window comparator to select pulses of sufficient amplitude to represent a useful transition in the capacitances at the probe which, of course, is sensitive to the dielectric effect of the sample. The window comparator is composed of amplifiers of operational amplifiers 52 labelled 94 and 96. In these amplifiers the signal level is compared against the voltage labelled V1 and V2. For example, if the input voltage to 94 is applied to the inverting input whenever the input voltage is below V1 the output will be high. For the period of time that the input voltage rises above V1 the output will remain low. Thus, the positive going pulse in waveform 82 causes a negative going pulse in waveform 98.

In a similar fashion the negative going pulse in waveform 82 appears as a negative going pulse from circuit 96 and has a waveform labelled 100. The two waveforms 98 and 100 are the outputs of the circuit. Waveform 98 has a negative going pulse whenever the element encounters an increase in capacitance as when it is proximate a high dielectric material. Waveform 98 has a negative going element whenever the probe encounters a liquid interface of increasing conductance or dielectric constant. In a similar fashion, waveform 100 is a negative going pulse whenever the element decreases in capacitance, i.e., when it encounters an interface of decreasing conductance or dielectric constant.

The sensor of this invention greatly facilitates the detection of the liquid interfaces which occur in any container with different layers, usually of immiscible liquids. The sensor does not interfere with the liquid interfaces and yet locates the interfaces such that a separate pipettor can quickly be introduced into the container and lowered the desired-level.

What is claimed is:

1. A non-contacting capacitive sensor for determining the level of an interface between two liquids having different dielectric values, the liquids being held in a container having a generally vertical axis, the sensor comprising:

an electrically conductive element,
    first drive means for translating the element along the outer surface of the container generally parallel to the axis,
    an oscillator coupled to the element for applying a high frequency signal to the element, the amplitude and/or phase of the high frequency signal being affected by the capacitance of the element, and
    comparator means for generating a level sense signal according to the amplitude or phase of the high frequency signal for signalling the element having reached a liquid interface, whereby such signal denotes the region along the container axis where there is a liquid interface.

2. A sensor as set forth in claim 1 wherein the comparator means is responsive to an increasing or decreasing capacitance of the element as a function of vertical position along the container.

3. A sensor of claim 2 wherein the element comprises a flat plate oriented transversely of the axis.

4. A sensor of claim 2 which also includes a probe for withdrawing liquid from the container, and
    second drive means for introducing the probe into the container and withdrawing liquid therefrom, said second drive means being responsive to the level sense signal for limiting the probe movement so as to not penetrate the interface.

5. A sensor of claim 4 wherein the element comprises a flat plate oriented transversely of the axis.

6. A sensor of claim 1 which also includes a probe for withdrawing liquid from the container, and
    second drive means for introducing the probe into the container and withdrawing liquid therefrom, said second drive means being responsive to the level sense signal for limiting the probe movement so as to not penetrate the interface.

7. A sensor of claim 6 wherein the element comprises a flat plate oriented transversely of the axis.

8. A method for determining the position of an interface between two liquids having a different dielectric values, the liquids being held in a container having a vertical axis, comprising the steps of:

applying a high frequency signal to an electrically conductive element from a signal source, the phase or amplitude of the high frequency signal being a function of the capacitance of the element,
    translating the element along the outer surface of the container generally parallel to the axis,
    detecting the phase or amplitude changes in the signal from the element, whereby such change denotes a liquid interface along the container axis.

9. A method according to claim 8 which includes a probe for withdrawing liquid from the container and the steps of:

introducing the probe into the container and withdrawing liquid therefrom, and
    limiting the probe movement in accordance with the detected change in phase or amplitude to direct the pipetting probe to the desired layer while preventing contact with undesired layers.

* * * * *